July 19, 1949.  O. E. KASE  2,476,444
PUNCHING AND SORTING CONTROL MECHANISM
Filed Sept. 26, 1947  7 Sheets-Sheet 1

INVENTOR
OTTO E. KASE
BY John L. Sterling
ATTORNEY

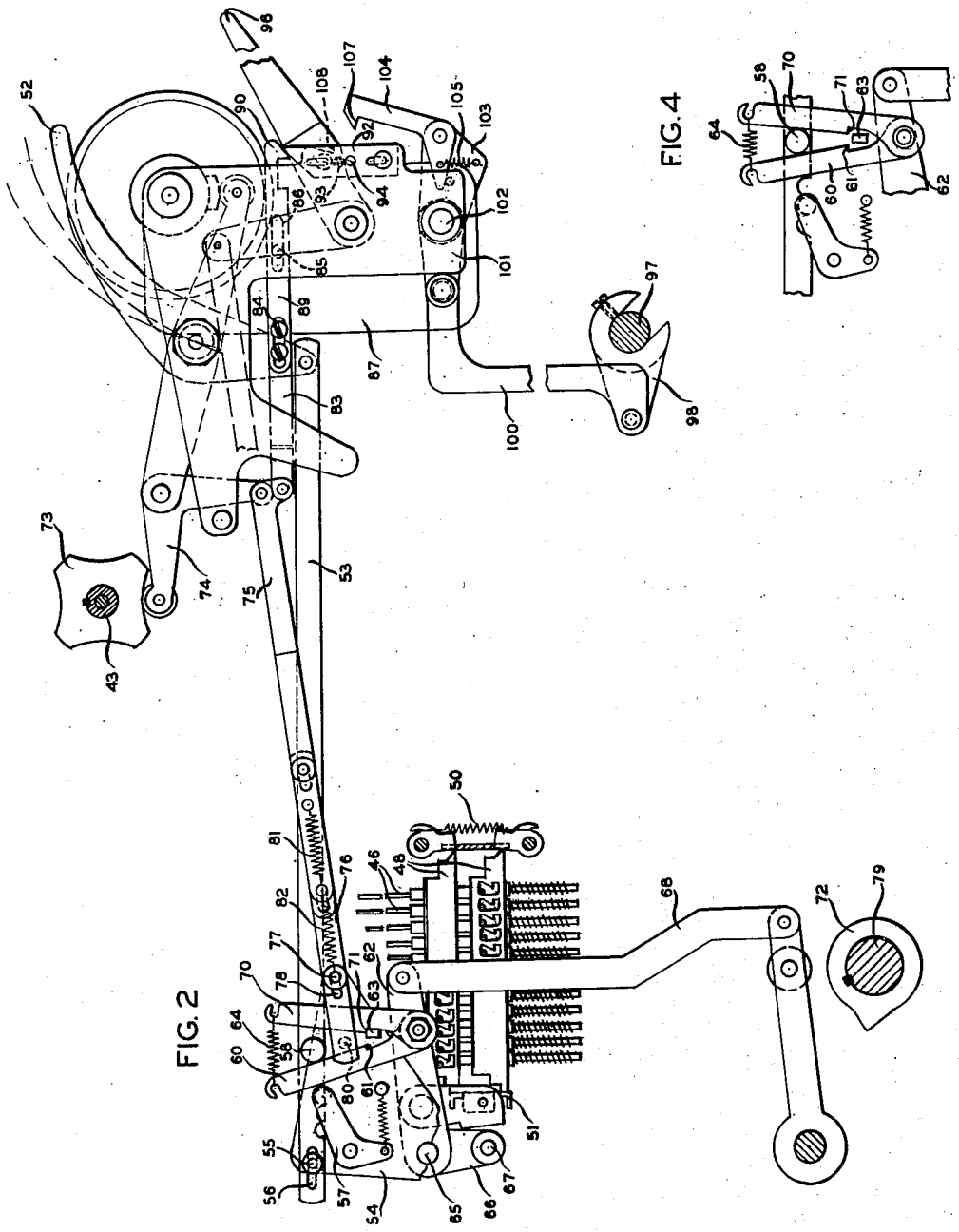

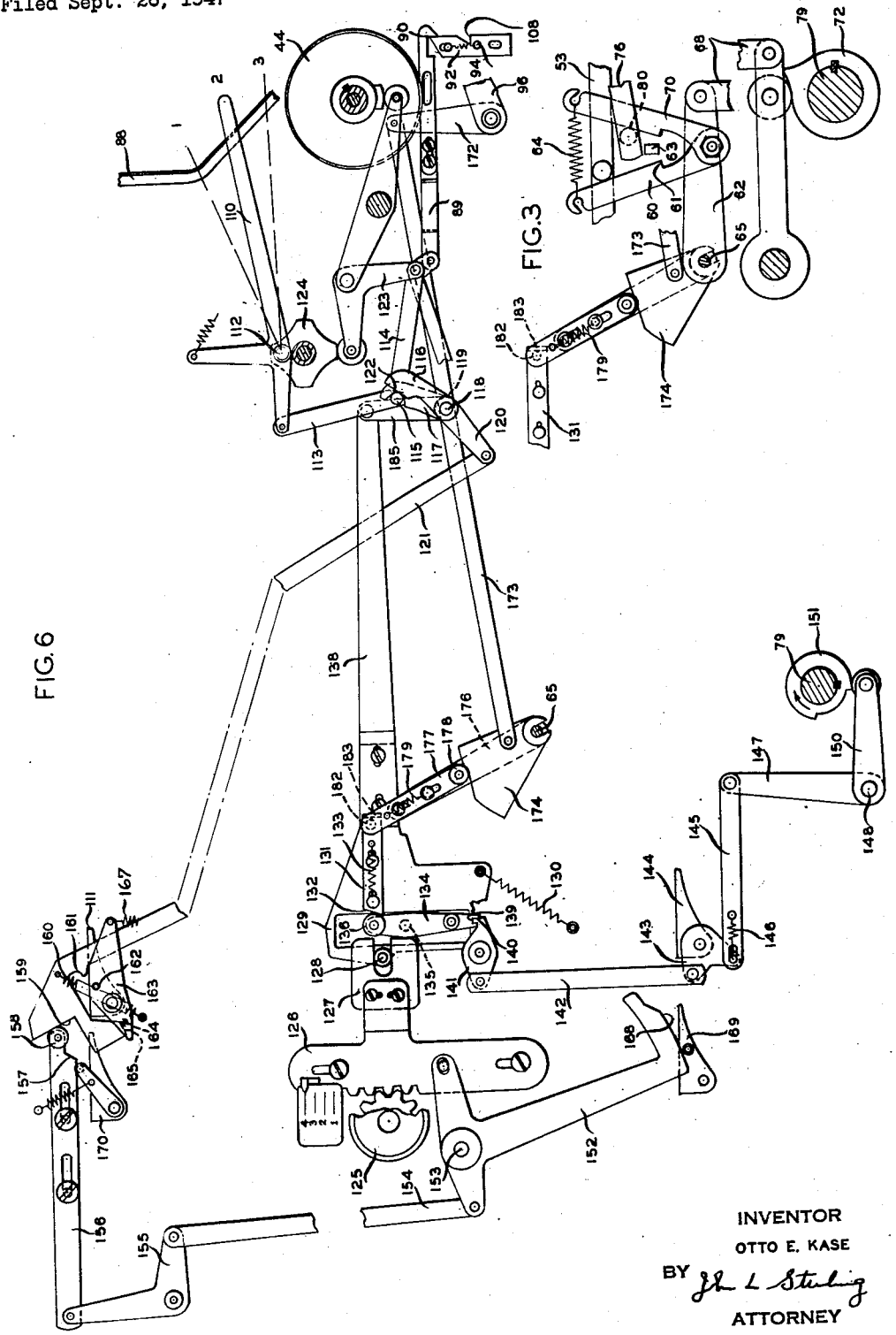

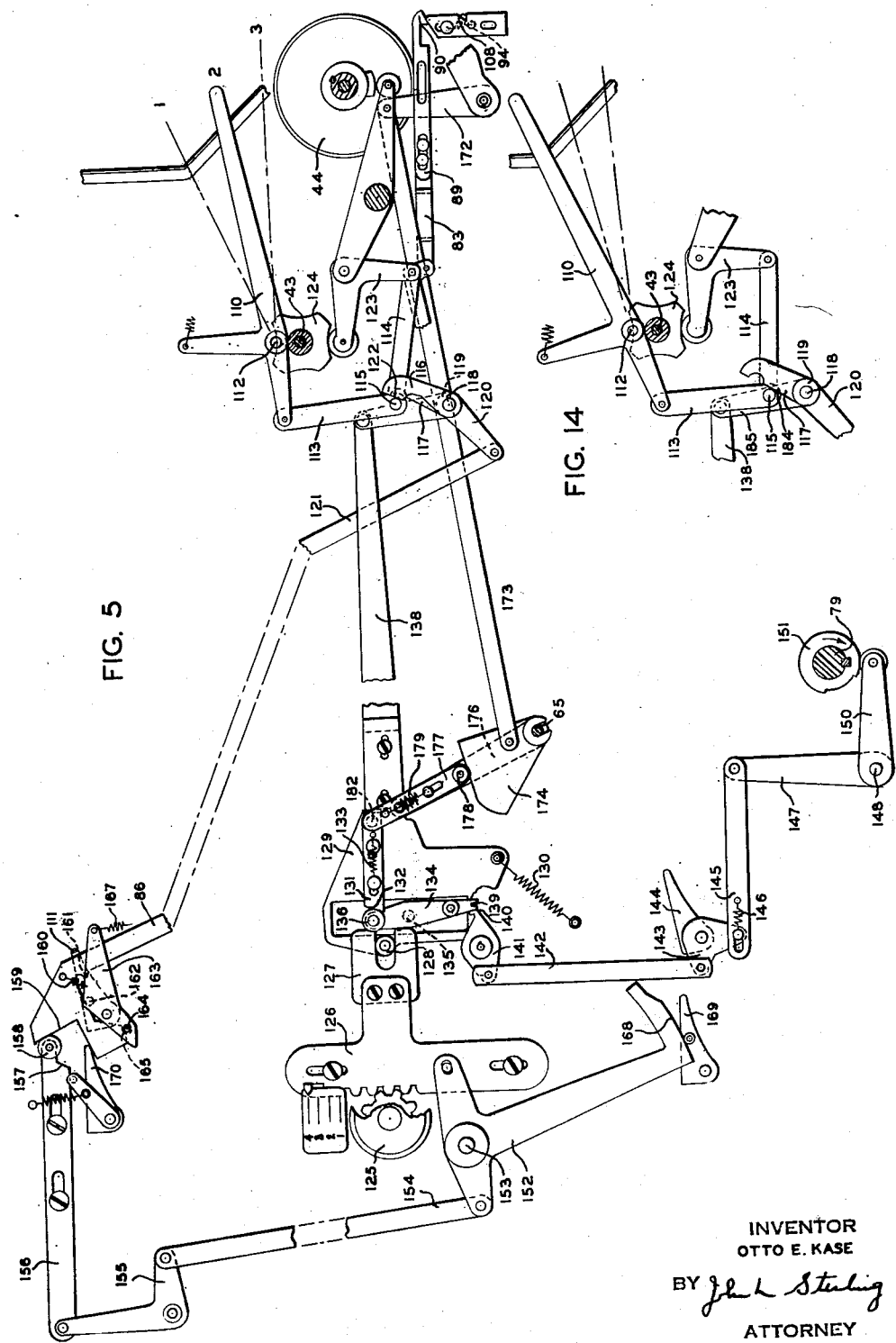

July 19, 1949.    O. E. KASE    2,476,444
PUNCHING AND SORTING CONTROL MECHANISM
Filed Sept. 26, 1947    7 Sheets-Sheet 5
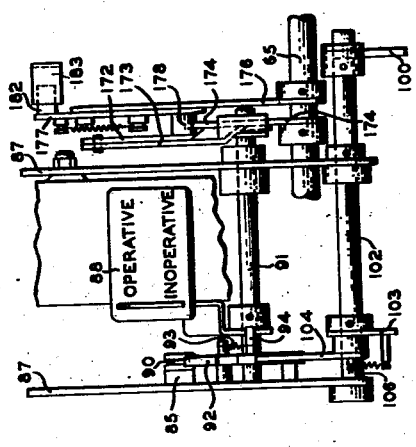
INVENTOR
OTTO E. KASE
BY
ATTORNEY July 19, 1949. O. E. KASE 2,476,444
PUNCHING AND SORTING CONTROL MECHANISM
Filed Sept. 26, 1947 7 Sheets-Sheet 6

INVENTOR.
OTTO E. KASE

July 19, 1949.  O. E. KASE  2,476,444
PUNCHING AND SORTING CONTROL MECHANISM
Filed Sept. 26, 1947  7 Sheets-Sheet 7

INVENTOR.
OTTO E. KASE
BY
ATTORNEY

Patented July 19, 1949

2,476,444

UNITED STATES PATENT OFFICE 2,476,444

PUNCHING AND SORTING CONTROL MECHANISM

Otto E. Kase, Valley Stream, N. Y., assignor to Remington Rand Inc., New York, N. Y., a corporation of Delaware Application September 26, 1947, Serial No. 776,315

15 Claims. (Cl. 164—114)

This invention relates to statistical card comparing machines, and particularly to means for variably controlling the punching of additional data in one record of a group of records, as the result of the comparison or non-comparison of that record with another record containing the additional perforations; and also to means for variably controlling the sorting and interfiling of records as the result of a comparison or a non-comparison with other record cards.

An embodiment of the invention is shown herein as employed in a statistical card comparing machine such as the one disclosed in Patent 2,211,094 to K. J. Braun, issued August 13, 1940, said machine also having the improvements shown in Patent 2,214,010 to K. J. Braun, issued September 10, 1940, and Patent 2,229,983 to J. M. McDonnell, issued January 28, 1941, and a pending application of J. T. Ferry, S. N. 567,041, filed December 7, 1944.

A machine of the type disclosed in these patents is used in punched card accounting or statistical systems in which both master and detail records are utilized. In these systems it is desirable to compare pre-punched designative data in master records with that in the detail records, and to control or effect various other operations involving these records in accordance with the comparison or non-comparison of the preselected designative data in both.

With the machine shown in the aforementioned patents any one or any combination of three types of operation can be performed, according to the particular type of statistical or accounting problem, viz., 1. Record sorting, including interfiling;
2. Record punching;
3. Stopping of the machine, e. g., to permit the insertion of control records at desired points in the run of compared records.

The machine is also provided with variably controllable master and detail card feeding mechanisms, whereby any one of eight different card feeding operations may be executed in conjunction with sorting and/or interfiling, and/or punching, and/or stopping operations, which operations are also variably controlled by mechanisms provided therefor.

In order to precondition the machine for a combination of the aforementioned operations, manually settable controls are provided, viz., for controlling punching, sorting, interfiling and selection of card feed.

While heretofore the machine could be preconditioned by the above mentioned controls to execute a great variety of operations, certain statistical problems require a mode of operation of the machine not possible with said controls and the mechanisms they influence. To overcome the inability of the machine to perform these operations, the present invention provides manually settable means to variably alter the effect of the settings of the preconditioning controls.

The present invention provides as its principal object improved operation selection mechanism, whereby the range of operations possible on a given machine is widened.

Another object of the invention is to provide improved means to control record punching in such machines, in accordance with the setting of the punch control mechanism and the occurrence of a comparison or non-comparison between the perforation patterns of simultaneously sensed master and detail cards.

Still another object of the invention is to provide improved means to control record sorting in such machines, in accordance with the setting of the sorting control mechanism and the occurrence of a comparison or non-comparison between the perforation patterns of simultaneously sensed master and detail records.

A more clear conception of the construction, operation, and further objects of the invention may be had from the following specification when read in conjunction with the following drawing, in which Fig. 1 shows a cross-section of a machine incorporating the invention;

Fig. 2 is a detail showing of the punch retract control mechanism positioned to permit punching on a non-comparison, with the control cam in "comparing" position;

Fig. 3 is a view of a portion of the punch control mechanism of Fig. 2 in operated position, and a portion of the pocket control mechanism;

Fig. 4 is a detail view of the control latches of the punch retract control mechanism in disabled position;

Fig. 5 is a view of the interfiler pocket control mechanism set in "non-comparing" position and the control cam in the "comparing" position;

Fig. 6 is a view similar to Fig. 5 with the control cam in the "non-comparing" position;

Fig. 7 is a detail view of the control lever of the invention in operative position;

Fig. 8 is similar to Fig. 7 with the control lever in inoperative position;

Fig. 9 is a front elevation of the mechanism of Fig. 7;

Figure 11:
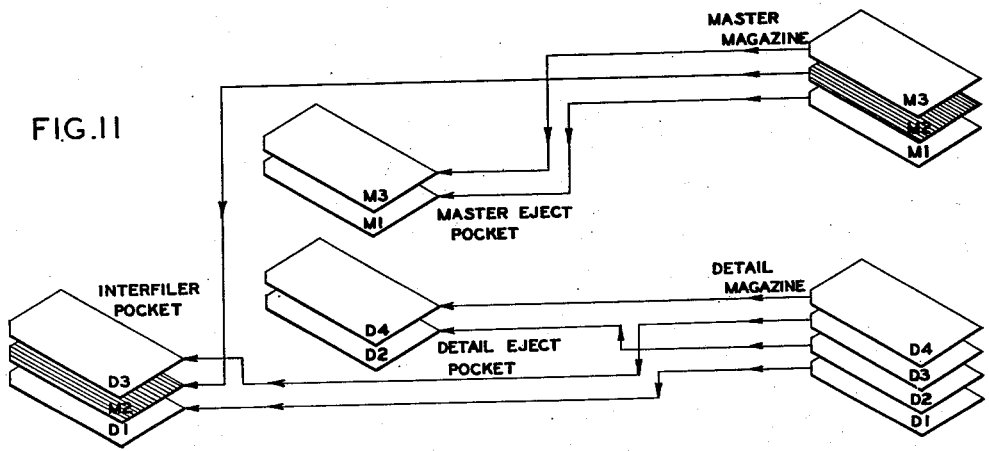
Figure 12:
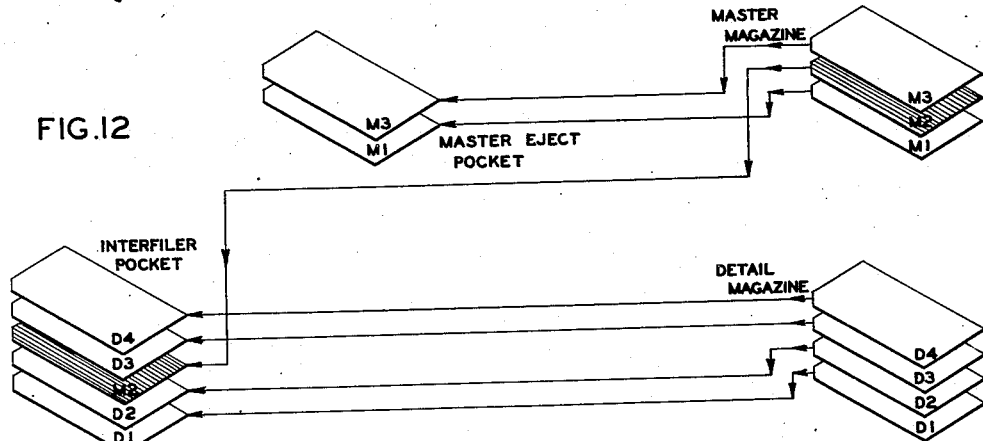
Figure 13:
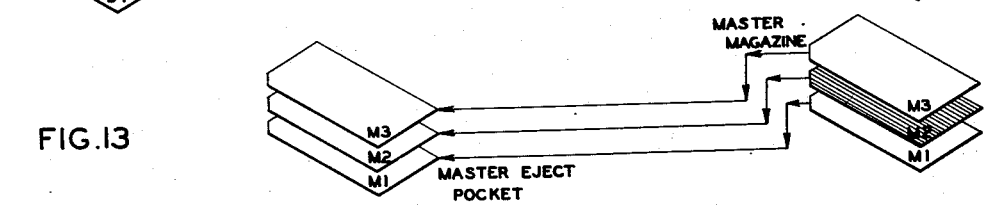

Figs. 11, 12, and 13 are diagrams of the travel of records through the machine; and Fig. 14 shows a portion of the sorting control mechanism with the sorting control lever in position #1.

Figure 1:
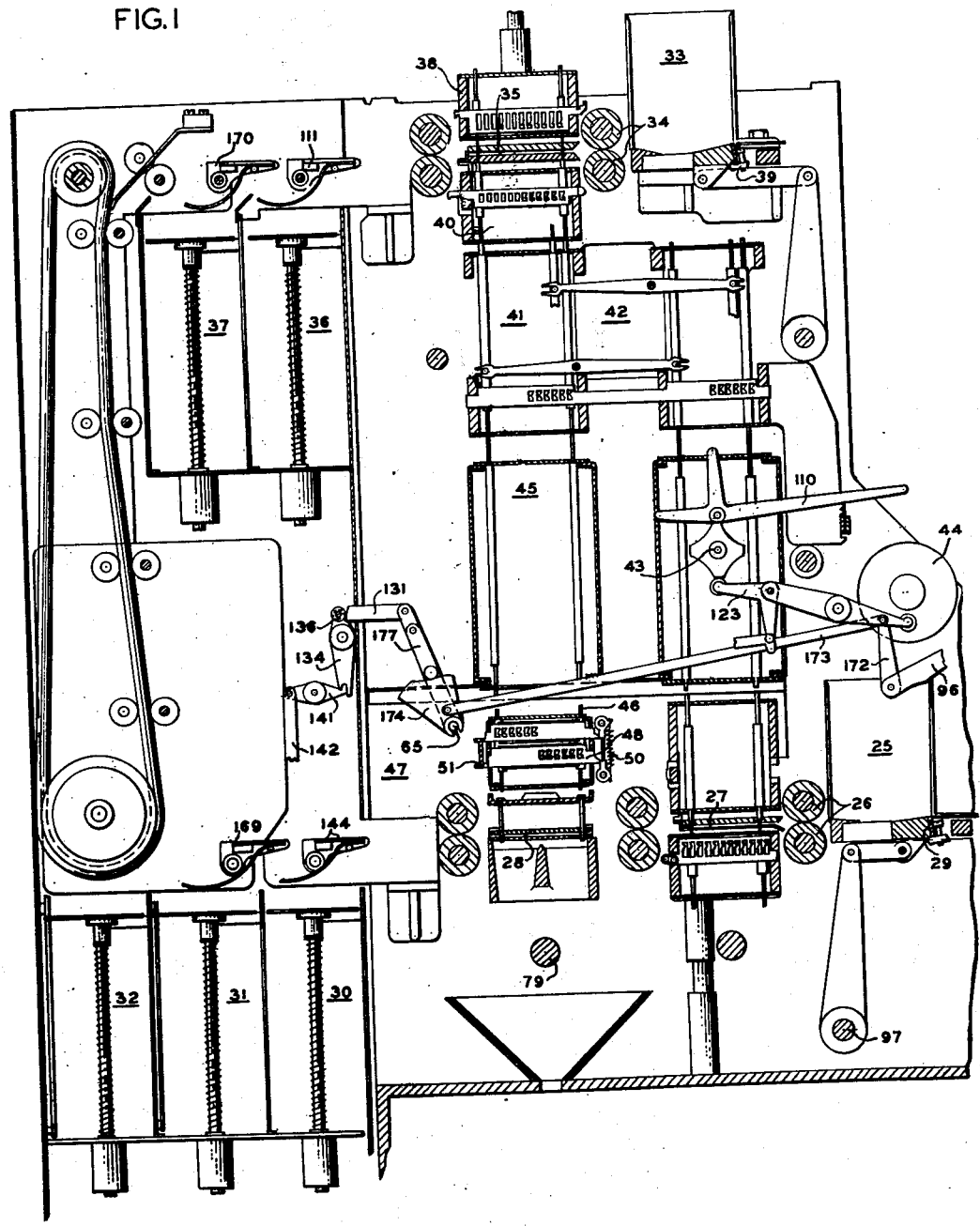

In a statistical card comparing machine of the type described in the cited patents (see Fig. 1), detail cards are placed in a detail card magazine 25 and by means of the usual picker knife 29 are fed seriatim to suitable feed rolls 26, whereby they are conveyed, first, to a sensing chamber 27 in which the perforated patterns therein contained are analyzed, and, second, to a punch chamber 28 in which additional data may be perforated in the cards. From the punch chamber 28, the detail cards are conveyed to either an eject pocket 30 or receiver pocket 31 or to an interfiler pocket 32, depending on the settings of the card sorting controls and the data in the cards.

The master cards are placed in a master card magazine 33 and are fed seriatim by a second card picker 39 to suitable feed rolls 34, whereby they are conveyed to a master card sensing chamber 35 in which their perforation patterns are analyzed. From the sensing chamber the master cards are fed to either a reject pocket 36 or a receiver pocket 37, or to the interfiler pocket 32, depending on the settings of the sorting controls and the data contained in the cards.

In order to retain the master and detail card sensing chambers, and also in the punch chamber, for whatever period of time is necessary to the operation of the machine, suitable card stops are provided. Said card stops and their controls are fully shown and described in the aforementioned patent to Braun 2,211,094, and will not be further mentioned herein other than to indicate the times at which they permit cards to be fed from the three chambers.

As is fully described in the aforementioned Patent 2,211,094, while a card is in the master card sensing chamber 35, the perforation pattern therein is analyzed by a reciprocating sensing mechanism 38 through which a mechanical representation of said pattern is transmitted to pins in a reading retaining mechanism 40, wherein it is locked until another master card is sensed. The pins of the reading retaining mechanism transmit their motion directly to a master card comparing pin assembly 41 in a comparing mechanism 42.

In so far as the present invention is concerned, a knowledge of the specific construction and manner of operation of the comparing mechanism 42 is not essential. It, however, is fully disclosed and described in the above mentioned patents, and it is sufficient to understand that in this mechanism the mechanical representation of perforation patterns in simultaneously sensed master and detail cards are mechanically compared, and the occurrence of a comparison or non-comparison is utilized to control or vary the aforementioned machine functions through a control cam assembly 43. Which is rotated by the comparing mechanism upon the occurrence of a comparison following a non-comparison, or a non-comparison following a comparison. In the former case a so called comparing cycle of the machine will follow the rotation of said assembly, and in the latter case a so called non-comparing cycle will follow.

As previously mentioned, detail cards are conveyed from the sensing chamber 27 to the punch chamber 28, where additional data, pre-punched in the master cards, may be punched in either comparing or non-comparing detail cards, depending on the setting of the puch controls and the card feed selector dial 44. The information to be punched in a detail card is transmitted from the pins in the aforementioned comparing mechanism 42 to corresponding pins in a removable translator unit 45. From the translator the mechanical representation of the perforation pattern is carried to the set pins 46 of a punch mechanism 47, wherein it is locked by locking slides 48 (Fig. 2) which are urged to locking position by springs 50.

A punch retract mechanism including a bail 51 is provided, not only to erase a set-up in the punch set pins 46 but also, if desired, to prevent punching by not allowing any of the set pins 46 to be locked down in punching position.

Normally, the retract mechanism is actuated once in every cycle of the machine, shortly after punching.

In certain statistical problems in which master cards denoting certain periods of time are to be compared with detail cards, each containing data for a unit of time in said period, it is desirous to transmit information from said master cards to the detail cards of the highest order in each group, and to interfile the punched detail cards with any non-comparing master cards while rejecting comparing master cards and the remaining detail cards.

In certain other statistical problems it is desirous to punch and interfile all detail cards with any non-comparing master cards, while rejecting comparing master cards.

Another statistical problem is to punch and interfile only the first comparing detail card of each group, while rejecting the remaining detail cards and all master cards.

First operation

To accomplish the first of the desired operations, i. e., to punch only the first comparing detail cards of each group and to interfile said punched cards with any non-comparing master cards while rejecting comparing master cards and the remaining detail cards, the present invention modifies certain operations already performed by the reproducing punch, and to this end the machine is preconditioned as follows:

The card feed selector dial 44 is set at the position #8 (Fig. 2) which provides for detail card feeding on a comparison and master card feeding on a non-comparison, exactly as described in Patent 2,211,094.

The punch control lever 52 is set at its "lower" position (Fig. 2) which normally provides for punching of all non-comparing detail cards, as is completely described in Patent 2,214,010, and will be briefly described herein.

Pivotally secured to the lower end of control lever 52 (Fig. 2) is a link 53 which extends rearwardly to cooperate with the punch retract mechanism. Said link 53 is slidably supported at its rearward end on a frame piece 54 by a pin and slot connection 55, 56. A spring pressed detent 57 cooperates with notches in the underside of link 53 to hold said link in its various set positions.

The link 53 carries a stud 58 which is adapted to cooperate with a pair of vertical latch arms 60 and 70 pivotally mounted on a lever 62. The latches 60 and 70 are provided with shoulders 61 and 71, respectively, which cooperate with a stud 63 in the frame piece 54. Latches 60 and 70 are drawn together toward stud 63 by a spring 64.

The lever 62 is a portion of the retract mechanism and is secured at one end to a shaft 65, hereinafter referred to as the retract shaft. Also secured to the retract shaft are two pendant levers 66 carrying rollers 67 adapted to cooperate with the retract bail 51. At its other end, lever 62 is connected to a push link 68 which, in turn, is connected to the follower arm of a cam 72 fast on shaft 79 and hereinafter referred to as the retract cam. Said shaft and cam are rotated once during each machine cycle.

The construction is such that placing lever 52 in its "lower" position causes link 53 to be pushed rearward (to the left in Fig. 2), and stud 58 thereon rocks latches 60 and 70 counterclockwise, thus tensioning arm 70 against stud 63. When the high point of the retract cam 72 elevates push link 68 and through lever 62 rocks the retract shaft 65 counter-clockwise, the rollers 67 are rocked against bail 51, forcing locking slides 48 to the ineffective or "retracted" position (shown in Fig. 2) against the tension of their springs 50. In this position of the locking slides 48 the set pins 46 cannot be locked down and all set pins that had previously been locked down are released. Simultaneously, with the retracting of slides 48, lever 62 elevates latches 60 and 70, allowing spring 64 to draw shoulder 71 of the latter arm over stud 63, thus locking the parts in the "retracted" position, as shown in Fig. 2. In the present instance, the mechanism is thus locked in "retracted" position during all "comparing" cycles of the machine, allowing no comparing details cards to be punched.

To provide for punching of non-comparing detail cards during this setting (control lever 52 in "lower" position) of the machine the following mechanism is provided.

Associated with a cam 73 in the control cam assembly 43 is a follower bell-crank 74, to the depending arm of which is secured the forward portion 75 of a compound link 75, 76. The rear portion 76 of said compound link is slidably mounted on the frame 54 by a pin and slot connection 77, 78, and is provided with a stud 80 adapted to cooperate with latches 60 and 70, between which it is positioned. The two portions of the link are connected by pin and slot couplers and are drawn together (the front portion toward the rear of the machine, and the rear portion toward the front) by a strong spring 81. A spring 82, weaker than spring 81, connects rear portion 76 of the compound link to the frame piece 54, and tends to draw said compound link rearward, thus tensioning the horizontal arm of follower bell-crank 74 against cam 73.

The construction is such that when a non-comparison is sensed, the control cam assembly 43 is rocked approximately 45°, bringing a high dwell of cam 73 into engagement with follower bell-crank 74, and rocking said follower bell-crank counter-clockwise. This pulls link 75, 76 forward (to the right in Fig. 2), stretching spring 82 and drawing stud 80 into engagement with latch 70. However, stud 80 does not immediately rock latch 70 clockwise to release it from stud 63. Instead, spring 81 stretches, as it is not strong enough to overcome the combined counter tension of springs 82 and 64, plus the friction between shoulder 71 of latch 70 and stud 63, the greater part of which friction is caused by springs 50 through slides 48, bail 51, rollers 67 and lever 62. When the high point of retract cam 72 next engages its follower, push link 68 is elevated slightly and through lever 62 elevates latch 70, eliminating the friction between shoulder 71 and stud 63 and allowing spring 81 to overcome springs 64 and 82 and through stud 80 to rock latch 70 clockwise, free of stud 63. In this position of the parts (see Fig. 3) the retract mechanism is controlled solely by the retract cam 72 which provides for retracting of the locking slides 48 once during each cycle of the machine. Thus, punching will occur during all machine cycles in which the mechanism is conditioned as just described, i. e., to allow non-comparing detail cards to be punched.

However, as it is desired to punch only the first comparing detail card of each group, the present invention provides means, hereinafter described, to so modify the normal operation described above.

Connected to the forward end of the aforementioned link 75 is a link 83 (see Fig. 2) which, in turn, has a link 89 adjustably connected thereto by a screw and slot coupling 84. The link 89 is supported and guided for front and rear sliding movement by a screw 85 working in a slot 86 in said link. The screw 85 (see Figs. 7 and 9) is secured in the outer of two auxiliary frame plates 87 which are suitably fastened to and spaced from the left hand side frame 88 of the machine.

The forward end of link 89 is formed with a hooked portion 90 (see also Figs. 5, 6, 7) which is adapted to cooperate with the nose of a latch 92, when said hook is in its foremost position, as shown in Fig. 6. The latch 92 is slidably mounted on the outer plate 87 and is resiliently urged upward by a spring 93. A pin 94 is secured in latch 92 and is adapted to cooperate with a cam surface 95 on a control lever 96. The control lever 96 is secured to a shaft 91 and projects through an indicator plate mounted on the frame 88. This lever, when in the "operative" position of Figs. 2 and 7, permits latch 92 to be effective; however, when lowered to the "inoperative" position of Fig. 8, cam surface 95 of said lever engages pin 94 and pulls the latch downward, removing the nose thereof from the path of hook 90. The lever 96 is also used to affect the sorting controls of the machine in a manner to be described hereinafter.

When on a non-comparison a high portion of cam 73 rocks bell-crank 74, the normal operation as above described would be for the stud 80 on link 75 to rock arm 70 free of stud 63, thus releasing lever 62. However, rocking bell-crank 74 also moves link 83, 89 toward the front of the machine engaging hook 90 with latch 92. The parts will remain latched in this position, regardless of the operation of cam 73, until such time as a detail card is fed, as will presently be described.

Fastened to the detail card feed shaft 97 (Fig. 2), which operates the picker knife 29, is an arm 98, to which is connected an upwardly extending L shaped link 100. At its upper end link 100 extends forwardly and is connected to an arm 101 fast on a shaft 102 which is journaled at both ends in the plates 87. Also fast on shaft 102 is another arm 103, to the forward end of which is pivoted a bell-crank 104. A spring 105 resiliently connects arm 103 and bell-crank 104, and tensions said bell-crank in a counter-clockwise direction against a limit stud 106 secured in the outer plate 87. The upright arm of bell-crank 104 has a hook 107 formed on its upper end, said hook being adapted to cooperate with a notch 108 in the forward edge of latch 92.

The construction is such that every time the detail card feed shaft 97 is rocked to feed a detail card into the sensing chamber 27, link 100 will be pulled downwardly, rocking shaft 102 through arm 101. This causes arm 103 to be rocked counterclockwise, and the forward end of bell-crank 104 to be moved upwardly. As the bell-crank 104 is moved upwardly, it is rocked counter-clockwise by spring 105, thus engaging the hook portion 107 with notch 108 of latch 92.

After the detail card is fed to the sensing chamber, shaft 97 is rocked clockwise to normal position, pushing link 100 upward. This rocks arm 101 clockwise, drawing bell-crank 104 downward. The position of stud 106 is such that hook 107 is held in engagement with notch 108 by spring 105 until latch 92 is drawn down far enough to free hook 90 from shoulder 91. The horizontal arm of bell-crank 104 then engages said stud and is rocked clockwise, freeing hook 107 from notch 108, thus allowing spring 93 to draw latch 92 upward to normal position.

It will be understood that in the present embodiment the detail card feed shaft 97 is utilized because of its proximity and accessibility. However, any other means, operating bell-crank 104 at the same time and in a like manner, may be used without deviating from the spirit of the invention.

In order to afford clarity of description, it is deemed advisable at this point to explain only the punching operation as performed by the just described mechanisms and control settings. The sorting and interfiling mechanisms, and the manner in which they are utilized in the desired operation, will be described hereinafter.

In the operation about to be explained, as well as the other operations to be explained hereinafter, a very simple presorted set of master and detail records will be utilized. Said set will consist (as shown in Figs. 11, 12, and 13) of three master records and either three or four detail records, the pre-punched designative data in the first two of said detail records comparing with that in the first master record, and the last one or two detail records comparing with the third master record. The second master record does not compare with any of the detail records and is, therefore, considered a non-comparing master record. It will, of course, be understood that in practice a greater number of both detail and master records will be used, and possibly a correspondingly greater number of master records will be non-comparing master records, the described set being used merely for clarity of description.

Figure 10:
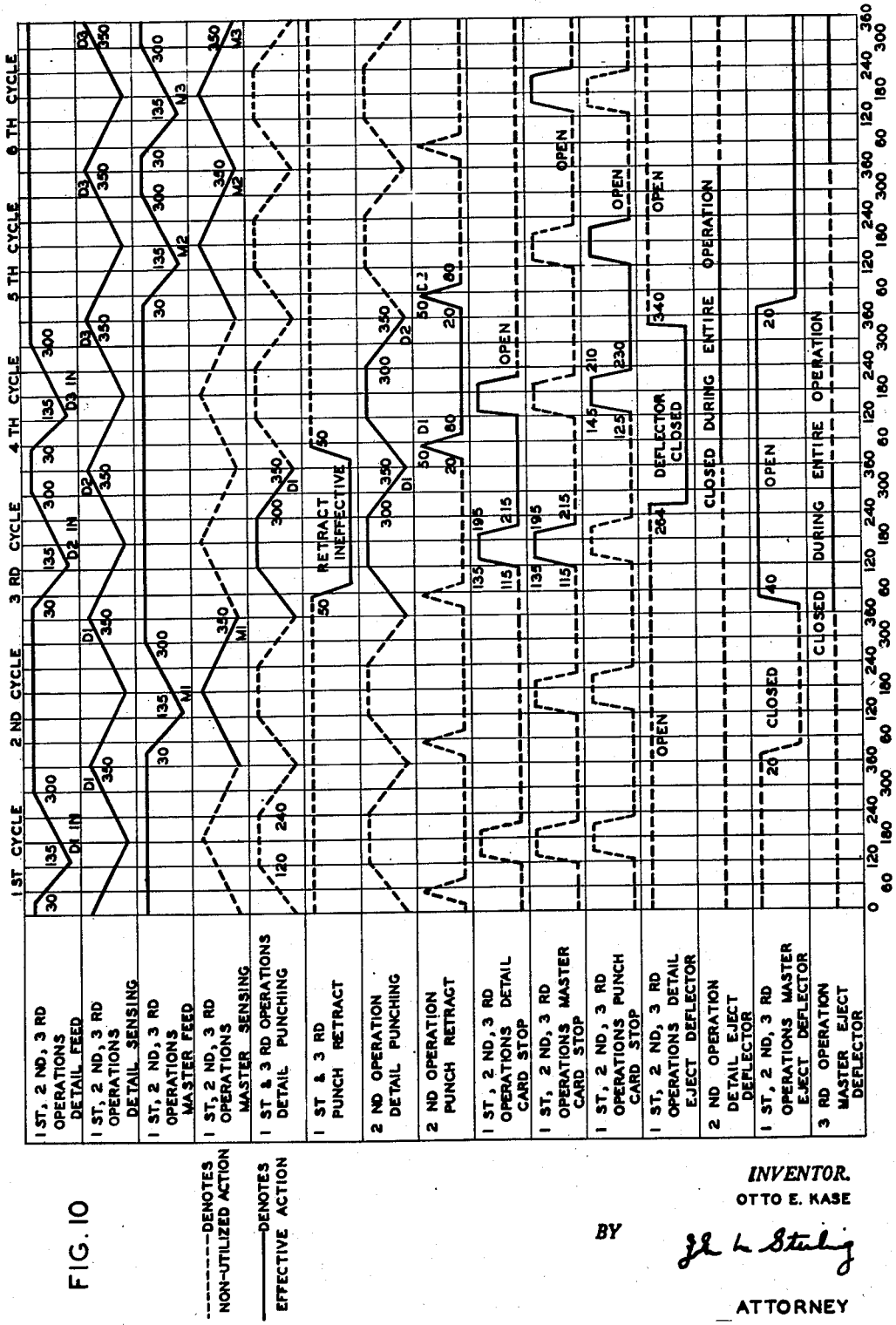
Fig. 10 is a timing diagram of the invention.

Referring to the operation and time charts (see Figs. 10, 11) it will be seen that due to the comparison created by the absence of cards in the machine, a detail card is fed into the sensing chamber 27 during the first cycle. This detail card (hereinafter referred to as D—1), creates a non-comparison because of the absence of a card in the master card sensing chamber 35, and, early in the second cycle, the control cam 73 is rotated, causing link 83, 89 to be held forward by latch 92.

During the second cycle of the machine D—1 is again sensed and a comparison found, due to the fact that a comparing master card M—1 has been fed to the master card sensing chamber 35. This comparison causes the control cam 73 to rotate to the comparing position of Fig. 2 in the third cycle, but as link 89 is held forward by latch 92, the retract mechanism remains under control of cam 72, thus permitting punching.

Because of the comparison encountered in the second cycle, a second detail card (D—2) is fed into the sensing chamber 27 and D—1 is transmitted to the punch chamber 28 during the third cycle. At the same time link 83, 89 is released by latch 92, and moves rearwardly, causing latch 70 to be tensioned against stud 65, as previously described. However, due to the fact that the high dwell of the retract cam 72 will not again cause retraction until early in the fourth cycle, punching of data in D—1 will occur at about 300°–350° of the present third cycle.

In the fourth cycle, due to the comparison sensed in the preceding cycle (between M—1 and D—2), another detail card (D—3) is fed into the sensing chamber and D—2 is transmitted to the punch chamber 28. However, D—2 is not punched due to the fact that the high dwell of cam 66 caused the set pins 46 to be retracted, and shoulder 71 to latch over stud 63 at about 50° of the fourth cycle, thus preventing punching until after the sensing of D—3 which, being the first detail card of a new group, creates a non-comparison and a repeat of the second cycle, etc.

When the cards are fed from the master card sensing chamber, and also from the punch chamber, it is necessary to sort them into the various receptacles. Therefore, a sorting mechanism and an interfiler mechanism, pre-settable by means of a sorting control lever 110 and an interfiler control knob 125, are provided.

The sorting control lever 110 is set in position "2" (Fig. 6) which, in effect, is the same as the "upper" position described in Patent 2,229,983 to McDonnell, and also the "upper" position described in the pending application of Ferry, S. N. 567,041, all three positions providing for control of the master card eject pocket deflector 111, as is completely described in said patent and pending application, and will be described briefly herein.

The sorting control lever 110 (Fig. 5) is in the form of a three armed bell-crank and is pivoted at 112 on the frame of the machine. The rearwardly extending arm of said bell-crank carries a pendant link 113 which is connected to a forwardly extending link 114 by a pin 115. Said pin 115 is also adapted to cooperate with cam faces on either or both of two arms 116 and 117, the former fast on the shaft 118 and the latter fast on a sleeve 119 rotatably mounted on shaft 118. Also fast on shaft 118 is an arm 120 which is connected to a long rearwardly and upwardly extending link 121. In the present instance, pin 115 is in position (Fig. 5) to cooperate with cam face 122 on arm 116.

The aforementioned link 114 is connected at its forward end to a bell-crank 123, a roller on which cooperates with cam 124 of the control cam assembly 43. When a non-comparison is sensed and a high dwell of cam 124 is brought into effect, link 121 is pushed upwardly and rearwardly through bell-crank 123, link 114, pin 115, and arms 116 and 120. The use of this push on link 121 will become apparent during the explanation of the interfiler mechanisms.

The interfiler control knob 125 is set at its "4" position (Fig. 6), which, in conjunction with the "2" setting of the sorting control lever 110, normally provides for interfiling of non-comparing master cards and depositing of comparing master cards and all detail cards in their respective "eject" pockets.

To accomplish this, mechanisms are provided which are thoroughly described in the pending application of Ferry, S. N. 567,041, and which will be described briefly herein.

Suitably geared to the interfiler control knob 125 is a rack bar 126 which is raised to its uppermost position when said interfiler control knob is rotated to position "4." Connected to rack bar 126 is a forwardly extending forked member 127, between the tines of which rides a roller 128, pivoted on a plate 129 which is tensioned downward by a spring 130. It is evident, therefore, that raising bar 126 will cause plate 129 to be equally raised. A slide 131, the rearward edge of which is formed into a camming surface 132, is mounted on plate 129 by pin and slot connections and is urged rearward by a spring 133.

Just forward (to the right in Figs. 5 and 6) of roller 128, plate 129 is slotted to accommodate a latch arm 134, pivoted at 135 to the side frame of the interfiler unit. At its upper end, latch arm 134 is provided with a roller 136 adapted to cooperate with cam surface 132 of slide 131, and at its lower end said latch arm is provided with a notch 139 adapted to cooperate with a hook 140 on the forward end of a lever 141. Said lever 141 is pivoted at its center, and the rearward end thereof is connected to the upper end of a vertical link 142, the lower end of which is connected to one arm of a bell-crank 143. Said bell-crank is secured on the pivot of the detail card eject pocket deflector 144, and has a horizontal link 145 connected to its other arm by a pin in the bell-crank working in a slot in said link. A spring 146 tends to rock the bell-crank 143 counter-clockwise and in so doing tensions the hook 140 in the notch 139.

At its forward end link 145 is connected to an upright arm 147, the lower end of which is fast on a rock shaft 148. Also fast on shaft 148 is a follower arm 150 which carries a roller urged against a cam 151 by a suitable spring, not shown. Cam 151 is fast on the same shaft as the retract cam, viz., shaft 79, and completes one rotation during each machine cycle.

The construction is such, that raising plate 129 to its uppermost position, engages cam surface 132 of slide 131 with roller 136 camming said slide to the right as in Figs. 5 and 6.

It is evident, therefore, that with the parts in this position, latch arm 134 is tensioned counter-clockwise by slide 131 and its associated spring 133, but is prevented from moving in this direction by hook 140, which is in engagement with notch 139 at the lower end of said latch arm.

However, a reference to the detail eject deflector in time chart (Fig. 10) will show that at about 264° of every cycle the roller on arm 150 rides upon the shallow dwell of cam 151, which through link 145, bell-crank 143, and another link 142, serves to rock lever 141 clockwise to disengage latch 140 from notch 139, allowing the pretensioned latch arm 134 to rock counter-clockwise (Fig. 5). At about 340° of the next cycle, roller on arm 150 rides upon the high dwell of cam 151, and inasmuch as notch 139 is not in the path of movement of hook 140, spring 146 serves to rock bell-crank 143 and the detail card eject pocket deflector 144 counter-clockwise, thus opening said deflector and maintaining it open for succeeding cycles, in order to file all detail cards in the eject pocket.

A T link 152 is pivoted at 153 to the frame of the interfiler unit and the forward end of its horizontal arm is connected to the rack bar 126. The rear end of said horizontal arm is connected to a link 154 which at its upper end is connected to the horizontal arm of a bell-crank 155. The vertical arm of said bell-crank is secured to a slide bar 156, slidably mounted on the side frame of the interfiler unit by screw and slot connectors. At its forward end slide bar 156 is formed with a cam surface 157, the use of which will be explained hereinafter, and carries a roller 158 adapted to cooperate with a cam face 159 on the enlarged upper end of link 121. Said link is tensioned rearwardly and downwardly by a spring 160, holding cam surface 159 against roller 158. The link 121 is provided with a shoulder 161 adapted to cooperate with a pin 162 on the forward arm of a bell-crank 163. Another pin 164 in the rear arm of bell-crank 163 is adapted to cooperate with a cam surface 165 on the underside of the enlarged upper portion of link 121. The bell-crank 163 is secured to the pivot of the master card eject pocket deflector 111 and is tensioned clockwise by a spring 167, tending to hold pin 164 against cam surface 165 and pin 162 against shoulder 161.

The lower end of the pendant arm of the aforementioned T link 152 has a cam piece 168 formed thereon which, when the parts are positioned as in Figs. 5 and 6, holds the detail card receiver pocket deflector 169 permanently closed. Cam surface 157 of slide bar 156 serves a similar purpose, that is, it holds the master card receiver pocket deflector 170 closed while the interfiler mechanisms are in their number "4" position as in the present instance.

With these two deflectors permanently closed, all master and detail cards which by pass their respective eject pockets by reason of the deflectors thereof being closed, will be fed to the interfiler pocket 32 by a plurality of rollers and a belt, which are completely shown and described in the aforementioned pending application of Ferry.

The construction is such that the movement of rack bar 126 to its uppermost position causes slide bar 156 to be moved to its full forward position through T link 152, link 154 and bell-crank 155.

During the forward motion of slide bar 156, that is, before it reaches the limit of its movement, roller 158 thereon engages cam surface 159 on link 121 and pushes said link forward, disengaging shoulder 161 on said link from pin 162 on bell-crank 163. Immediately following this, cam face 165 on the underside of the enlarged portion of link 121 engages pin 164 on bell-crank 163, and rocks said bell-crank and deflector 111 in a counterclockwise direction against the tension of spring 167. Thus the master card eject pocket is opened and held open until a non-comparison occurs, at which time link 121 will be pushed upward, as has been previously described. This upward movement of link 121 will disengage cam surface 165 from stud 164, permitting spring 167 to rock the deflector 111 clockwise to close said eject pocket. Thus non-comparing master cards are fed to the interfiler.

However, this operation must be modified to allow only the first comparing detail card of each group to be interfiled. The means for effecting this modification will now be described.

The aforementioned control lever 96 (see Fig. 7) is fastened at its rearward end to a short rock shaft 91 which is journaled at both ends in the plates 87. Also fast on said rock shaft is an upright arm 172, to the upper portion of which is connected a long rearwardly extending link 173, said link having secured to its rearward end a fan cam 174, loosely pivoted on the retract shaft 65. An arm 176 having a link 177 slidably mounted thereon by pin and slot connectors is secured on the retract shaft 65 adjacent to fan cam 174. A roller 178 fastened to the lower end of link 177 is pressed down against the working surface of cam 174 by a spring 179 which is connected through a pin 180 to link 177 on one end, and at the other end to arm 176 through a pin 181. A pin 182 projects from the upper end of link 177 and is adapted to cooperate with an ear 183 formed on the forward end of cam slide 131, the use of which has been described heretofore.

The construction is such that when lever 96 is set in its lower or inoperative position (Fig. 8), link 173 is pulled forward, bringing the high dwell of fan cam 174 into engagement with roller 178. This elevates link 177, causing pin 182 to be raised above shoulder 183 to the ineffective position of Fig. 8.

The construction is also such that with the control lever 96 set in its upper or "operative" position, link 173 is held in its rearward position, causing roller 178 to ride upon the low dwell of cam 174. This positions pin 182 in line with ear 183. In the normal clockwise position of the retract shaft 65, pin 182 will draw slide 131 forward to relieve the tension on latch arm 134 (see Fig. 6) maintaining deflector 144 closed. This condition will exist for all comparing cycles of the machine due to the manner of controlling latch arm 134 and of the retract shaft 65, all as hereinbefore described.

It is evident, therefore, that link 177 and arm 176 form a unitary member adapted to affect detail card sorting under control of the retract shaft 65 and the fan cam 174.

It will be remembered that, as hereinbefore described, card D—1 was fed first to the sensing chamber 27 and thence to the punch chamber 28. wherein it was punched between 300° and 350° of the third cycle. It will also be remembered that said third cycle was a comparing cycle and early in that cycle the control cam assembly was rotated to comparing position. A reference to the time and operation charts will show that, due to the detail card feed in the third cycle, link 89 was freed from latch 92 at about 172° thereof, allowing the linkage 89, 83, 75 (Fig. 2) to move rearwardly. This permits latch 70 to be tensioned against stud 63, and when cam 72 effects retraction of the set pins 46 at about 50° of the fourth cycle, shoulder 71 of latch 70 snaps over stud 63 and locks the retract mechanism in retracted position. The retract shaft 65, which was rocked counter-clockwise by cam 72, is thus locked in that position, as are its associated arm 176, link 177, and stud 182 in said link. This position of stud 182 allows spring 133 and slide 131 to tension latch arm 134 counterclockwise, conditioning deflector 144 to be opened by cam 151. However, before said deflector is opened, the card stop associated with the punch chamber permits card D—1 to be fed from said chamber, at about 135° of the fourth cycle, over the closed deflector 144 and into the interfiler pocket 32. At the same time card D—2 is fed from the sensing chamber into the punch chamber. At about 340° of the fourth cycle, cam 151 effects opening of the preconditioned deflector, and, therefore, when card D—2 is fed from the punch chamber at about 135° of the fifth cycle, it will be deposited in the eject pocket 30. Card D—3 was fed into the sensing chamber 27 at the same time that D—2 was fed to the punch chamber 28, that is, about 135° of the fourth cycle, and as said card D—3 is the first detail card of a new group, it causes a non-comparison which, in the fifth cycle, initiates a repeat of the operations performed in the second cycle, etc.

During these same cycles of operation on the detail cards, the master cards are being handled in the following manner.

Master card M—1 was fed into the master card sensing chamber during the early part of the second cycle and sensed near the end of that cycle. This initiated a comparison and early in the third cycle, control cam assembly 43 was rotated to "comparing" position. This allows link 121 which had been held upward by the non-comparing position of assembly 43 to return to its lower position, opening deflector 111. At about 135° of the third cycle, the card stop associated with the master card sensing chamber permits card M—1 to be fed from said chamber and it is deposited in the eject pocket 36 at about 209°. However, the perforation pattern sensed in said card is locked in the pins of the reading retaining mechanism until another master card is sensed, that is, until the fifth cycle, when, due to the non-comparison caused by card D—3, a master card feed is initiated and card M—2 is fed into the sensing chamber 35.

As shown in the operation chart (Fig. 11), card M—2 is a non-comparing master card, that is, it has no associated detail cards, and as such does not disturb the "non-comparing" position of control cam assembly 43. Therefore, at about 135° of the sixth cycle a master card M—3 is fed into the sensing chamber, and M—2 is fed from said sensing chamber. Due to the "non-comparing" position of control cam assembly 43 deflector 111 is closed and card M—2 will pass over same and be deposited in the interfiler pocket 32. Master card M—3 is a comparing master card and will initiate a repeat of the operations initiated by master card M—1 in the third cycle.

*Second operation*

To accomplish the second of the desired operations, i. e., to punch all detail cards and to interfile them with any non-comparing master cards while depositing all comparing master cards in the master card eject pocket, the machine is preconditioned as follows:

The punch control lever 52 is set at its "intermediate" position which provides for punching of all detail cards, as completely described in the patent to Braun, 2,214,010, and as will be described briefly herein.

The remainder of the controls are set exactly as for the first operation, and the manner in which the machine is influenced by them is exactly the same.

The punch control lever 52, when placed in its "intermediate" position, moves link 53 in such a manner as to place stud 58 thereon in position (Figs. 2 and 4) to maintain shoulders 61 and 71 on latches 60 and 70, respectively, permanently out of engagement with stud 63. As hereinbefore pointed out, the unlatched position of both of these latches 60 and 70 permits the retract mechanism to pursue its normal operation of retracting the set pins 46 once during each machine cycle, under complete control of cam 72. Thus, punching will occur in all machine cycles in which a detail card is in the punch chamber.

Thus, the retract shaft 65, which is rocked counter-clockwise each time the retract mechanism is actuated by cam 72, is in its normal clockwise position for the greater part of each cycle (see Fig. 10), during which time stud 182, associated with said retract shaft, will hold slide 131 forward, relieving the tension on latch arm 134, thus maintaining eject pocket deflector 144 closed. When between 20° and 80° of each cycle the retract shaft 65 is rocked counter-clockwise, slide 131 is permitted to tension latch arm 134 counter-clockwise. However, said tensioning is to no avail due to the fact that cam 151, through the linkage hereinbefore described, maintains hook 140 in engagement with notch 139 of latch arm 134 from about 338° of one cycle until about 264° of the following cycle. Thus, deflector 144 is not opened during this operation of the machine.

Master card sorting is accomplished in exactly the same manner as in the first operation, that is, deflector 111 is normally open, but is closed momentarily to allow non-comparing master cards to be interfiled.

Referring to the time and operation charts it will be seen that, due to the comparison created by the absence of cards in the machine, a detail card D—1 is fed into the sensing chamber 27 during the first machine cycle. Card D—1 creates a non-comparison due to the absence of a master card in the machine, and said non-comparison effects rotation of control cam assembly 43 early in the second cycle. This initiates a master card feed and card M—1 is fed into the sensing chamber 35 during the same second cycle. Card M—1 creates a comparison and early in the third cycle, control cam assembly 43 is again rotated, permitting a second detail card D—2 to be fed into the sensing chamber 27 while card D—1 is being fed therefrom and into the punch chamber 28, wherein it is punched between 300° and 350° of said third cycle.

The initial rotation of control cam assembly 43, due to the non-comparison sensed in the first cycle, effected the closing of master card eject pocket deflector 111. However, said deflector was reopened early in the third cycle by the second rotation of control cam assembly 43. Therefore, when, at about 135° of said third cycle, card M—1 was fed from sensing chamber 35, the open deflector 111 caused it to be deposited in the master card eject pocket 36. The perforation pattern of card M—1 is, of course, retained in the pins of the reading retaining mechanism 40 until another master card is sensed.

During the first half of the fourth cycle card D—1 is fed from the punch chamber, over the permanently closed eject pocket deflector 144, and into the interfiler pocket 32. At the same time card D—2, which also compared with card M—1, is fed from the sensing chamber 27 into the punch chamber 28, and a third detail card D—3 is fed into the sensing chamber 27.

Card D—3 is the first detail card of a new group and, as such, creates a non-comparison when it is compared with the retained perforation pattern of card M—1, thereby rotating control cam assembly 43 early in the fifth cycle. This initiates a master card feed, and a second master card M—2 is fed into the sensing chamber 35. Inasmuch as cards M—2 and D—3 do not compare, the non-comparison created by card D—3 is continued, and in the sixth cycle a third master card M—3 is fed into the sensing chamber 35 while card M—2 is fed from said chamber. The rotation of control cam assembly 43 in the fifth cycle caused master card eject pocket deflector 111 to close and the continued non-comparison permitted it to remain closed through the sixth cycle. Therefore, when card M—2 was fed from the sensing chamber 35, it passed over the deflector 111 and was deposited in the interfiler pocket 32.

The master card M—3 creates a comparison in the latter part of the sixth cycle and initiates a repeat of the operations initiated by master card M—1 in the latter part of the second cycle.

*Third operation*

To accomplish the third of the above operations, i. e., to punch and interfile the first detail card of each group while rejecting the remaining detail cards and all master cards, the sorting control lever 110 set at its "1" position and the remainder of the controls are set as for the first operation.

This "1" position of lever 110 is the same in effect as the "lower" position of said lever described in the pending application of Ferry, S. N. 567,041, and a brief description thereof follows:

When placed in its "1" position (Fig. 14), lever 110 aligns stud 115 with cam face 184 of arm 117. Said arm is fast on sleeve 119 which is rotatably mounted on shaft 118, as hereinbefore described. The sleeve 119 also has an upright arm 185 fast thereon, said upright arm being connected at its upper end to a rearwardly extending link 138. The link 138 is connected at its rearward end to the aforementioned plate 129.

The construction is such that when stud 115 is moved forwardly on a non-comparison, as hereinbefore described, it rocks arm 117 and, therefore, arm 185 clockwise. Thus, link 138 and plate 129 are pulled forward. This movement of plate 129 serves to relieve the tension on latch arm 134 by slide 136, inasmuch as said slide is mounted on plate 129 and moves forward with it.

However, as previously described, the tension on latch arm 134 is also relieved by stud 182, which in the present instance operates on slide 136 in exactly the same manner as described in the first operation. It is apparent, therefore, that in the present instance the forward movement of plate 129 is merely an idle one, due to the necessity of placing stud 115 in working alignment with cam face 184 of arm 117, so as to maintain master card eject pocket deflector 111 permanently open, that is, this position of stud 182 is the only one in which it is ineffective to close the deflector 111 on a non-comparison.

As shown in the time and operation charts, the third operation proceeds exactly as the first in all respects, except for sorting of non-comparing master cards. In the present operation, non-comparing master cards are deposited in their eject pocket in the same manner that comparing master cards are deposited therein during the first and second operations.

It will, of course, be understood that the present invention could be modified in many ways without departing from the spirit thereof and also that various other machine operations may be accomplished by proper manipulation of the control devices, those described merely being examples.

What I claim as new, and desire to secure by Letters Patent, is:

1. In a machine of the class described, the combination with record feeding, sorting, and punching means and punch disabling means, all controlled by pre-settable devices and a comparing mechanism, of a control member, a resilient latch under control of said control member, a linkage cooperating with a latch in said punch disabling means, and adapted to be held by said resilient latch in position to control said punch disabling means regardless of said pre-settable devices or the comparing mechanism, and a trip for said resilient latch under control of said record feeding means.

2. In a machine for handling master and detail records, including a comparing mechanism for cyclically sensing comparisons or non-comparisons between designative data pre-punched in selected portions of said records and a punch mechanism, the combination of master and detail record feeding means and a punch disabling means, both controlled by pre-settable devices and by the comparing mechanism, and said punch disabling means including a first latch to hold said disabling means effective for all comparing and/or non-comparing cycles of the machine, of a second latch pre-settable to act when said first latch is ineffective to hold said first latch ineffective for an extra machine cycle, and a trip for said second latch controlled by the detail record feeding means and acting to free said first latch during the machine cycle following said extra machine cycle.

3. In a machine for handling master and detail records, including a comparing mechanism for cyclically sensing comparisons or non-comparisons between perforation patterns in preselected portions of such records, the combination of selectively controlled master and detail record feeding mechanisms, a punch mechanism for transferring additional perforation patterns from master records to detail records, punch disabling means, settable to be held effective to prevent punching when a comparison is sensed and to be rendered ineffective to prevent punching when a non-comparison is sensed; with a pre-settable latch, operable to hold said punch disabling means ineffective for the first comparison cycle following a non-comparison cycle and a trip for said latch under control of the detail record feed means acting in the second comparison cycle to trip said latch and render the punch disabling means effective.

4. In a machine for handling master and detail records, including a comparing mechanism for cyclically sensing comparisons or non-comparisons between perforation patterns in preselected portions of such records, selectively controlled master and detail record feeding mechanisms, a punch mechanism for transferring additional perforation patterns from master records to detail records, said punch mechanism including a plurality of set pins selectable under control of the master records, locking slides operative to retain selected set pins in position to effect punching, punch disabling means to render said locking slides ineffective momentarily during each machine cycle, and settable to hold said slides ineffective indefinitely when a comparison is sensed, and to be rendered ineffective to so affect said slides, by the comparing mechanism when a non-comparison is sensed, the foregoing combination in conjunction with a pre-settable latch operable to hold said punch disabling means ineffective for the first comparison cycle following a non-comparison cycle, and a trip for said latch under control of the detail record feeding mechanism, and acting in the second comparison cycle to trip said latch and render the punch disabling means effective indefinitely.

5. In a machine for handling master and detail records, including a comparing mechanism for cyclically sensing comparisons or non-comparisons between perforation patterns in preselected portions of such records; the combination of selectively controlled master and detail record feed mechanisms, a punch mechanism for transferring additional perforation patterns from master records to detail records, punch disabling means settable to be effective to prevent punching when a comparison is sensed and to be rendered ineffective to prevent punching when a non-comparison is sensed, and including a first latch to hold said disabling means effective, and a trip for said first latch under control of the comparing mechanism, and adapted to release said first latch and render said disabling means ineffective; with a pre-settable second latch, operable to hold said first latch released for the first comparison cycle following a non-comparison cycle and a trip for said second latch under control of the detail record feeding mechanism and acting in the second comparison cycle to trip said second latch and render said first latch effective.

6. In a machine for handling master and detail records, including a comparing mechanism for cyclically sensing comparisons or non-comparisons between designative data pre-punched in selected portions of said records; the combination of master and detail record feeding mechanisms, a punch mechanism for transferring additional pre-punched data from master records to detail records, said punch mechanism including a plurality of set pins selectable under control of the master records, locking slides operative to retain said set pins in position to effect punching and a retract mechanism operative during each machine cycle to render said locking slides ineffective momentarily for retaining selected set pins, a pair of spring urged latches, to retain said retract mechanism in operated position whereby the locking of selected set pins is prevented, said latches being pre-settable to maintain one latch ineffective during all machine cycles and the second latch effective when a comparison is sensed, said second latch being rendered ineffective by the comparing mechanism when a non-comparison is sensed; with a pre-settable catch operable to hold said second latch ineffective for the first comparison cycle following a non-comparison cycle and a trip for said catch under control of the detail record feeding mechanism, acting in the second comparison cycle to trip said catch and render said second latch effective.

7. In a machine for handling master and detail records, a plurality of record receiving receptacles, selectively controlled deflectors to open or close said receptacles, a first latch to hold one of said deflectors closed, a trip adapted to disable said first latch, a punch mechanism and punch disabling means including a second latch to hold said disabling means operated and, therefore, said punch mechanism disabled, a trip to disable said second latch under control of a comparing mechanism, a member connected to a moving part of said punch disabling mechanism and adapted to move with said part when said punch disabling means is operated and also adapted to disable the trip for said first latch when said punch disabling means is not held operated by said second latch, a third latch to hold the trip for said second latch effective regardless of the comparing mechanism and a trip for said third latch under control of a detail record feeding mechanism.

8. In a machine for handling master and detail records, including a comparing mechanism for cyclically sensing comparisons or non-comparisons between designative data pre-punched in selected portions of such records, a punch mechanism for transferring additional data pre-punched in master records to detail records, and selectively controlled master and detail record feeding mechanisms, the combination of, front and rear master record receiving receptacles, front and rear detail record receiving receptacles, an interfiler receptacle for both master and detail records, a deflector for each rear receptacle to shunt records there into, and pre-settable means to render said rear receptacle deflectors effective or ineffective to so shunt records, a deflector for each front receptacle and means for selectively rendering each effective or ineffective, said means including a plurality of pre-settable devices, and the part of said means associated with the front detail receptacle deflector also including a first latch to lock said deflector ineffective, and a trip for said first latch under control of the said pre-settable devices and the comparing mechanism, a retract mechanism operable to render said punch mechanism disabled momentarily during each cycle of the machine, a second latch under control of a pre-settable device whereby it is rendered effective to hold said retract mechanism operated when a comparison is sensed and also under control of the comparing mechanism whereby it is rendered ineffective when a non-comparison is sensed; with a member connected with the retract mechanism and adapted, when said second latch is ineffective, to disable the trip for said first latch regardless of the action of its pre-settable devices or the comparing mechanism and a third latch, pre-settable to retain the said second latch ineffective when a first comparison is sensed regardless of the action of its pre-settable device or the comparing mechanism, and to be rendered ineffective to influence said second latch by the detail record feeding means when a second comparison is sensed.

9. In a machine of the type described, the combination with detail record feeding and sorting means and master record feeding and sorting means, record punching means, and punch disabling means including a first latch to hold said punching means disabled, all controlled by pre-settable devices and by a comparing mechanism; of a control member linked to a camming agent and also cooperating with a resilient latch adapted to retain said first latch ineffective to hold the punching means disabled, regardless of the said pre-settable devices or the comparing mechanism, a trip for said resilient latch under control of the detail record feeding means, an arm connected to a moving part of said punch disabling means and adapted to move with said moving part when said punch disabling means is operated, an element resiliently connected to said member and positioned by said camming agent, said element being adapted to control said detail record sorting means when said punch disabling means is not operated, regardless of the said pre-settable devices or the comparing mechanism, and also adapted to be moved free of said detail record sorting means when said punch disabling means is operated.

10. In a machine for handling master and detail records including a comparing mechanism, a punch mechanism, and master and detail record feeding mechanisms, the combination of record segregation mechanisms including a plurality of record receiving receptacles for master records or detail records, deflectors to open or close said receptacles to such records, an interfiler receptacle for master and detail records, means, including a first latch and a trip for said first latch, for opening and closing said deflectors selectively, in accordance with a plurality of pre-settable controls and the comparing mechanism, said first latch and trip affecting only one of said deflectors, punch disabling means including a second latch pre-settable to hold said punch disabling means effective, and means under control of the comparing mechanism to disable said latch; with a member cooperating with said punch disabling means and adapted when said disabling means is ineffective to disable the trip for said first latch, whereby the deflector affected by said latch, is controlled by said member regardless of the said plurality of pre-settable controls or the comparing mechanism.

11. In a machine for handling master and detail records including a comparing mechanism for sensing comparisons or non-comparisons between designative data pre-punched in selected portions of said records, and a punch mechanism, the combination of, master and detail record feeding mechanisms, record segregation mechanisms including a plurality of record receiving receptacles for master records or detail records, deflectors to open or close said receptacles to such records, an interfiler receptable for master and detail records, means, including a first latch and a trip for said first latch, for opening and closing said deflectors selectively, in accordance with a plurality of pre-settable controls and the comparing mechanism, said first latch and its trip affecting only one of said deflectors, punch disabling means including a second latch pre-settable to hold said punch disabling means effective when a comparison is sensed and means under control of the comparing mechanism to disable said second latch when a non-comparison is sensed; with a member operable when said punch disabling means is ineffective to disable the trip for said first latch, whereby the deflector affected by said latch is controlled by said member regardless of the said plurality of pre-settable controls or the comparing mechanism.

12. In a machine of the type described, the combination with detail record sorting means and master record sorting means, record punching means and punch disabling means, all controlled by pre-settable devices and by a comparing mechanism; of a control member linked to a camming agent, a member connected to a moving part of said punch disabling means and adapted to move with said moving part when said punch disabling means is operated, a piece resiliently connected to said member and positioned by said camming agent to cooperate with said detail record sorting means when said punch disabling means is not operated, and thereby to control said detail record sorting means regardless of said pre-settable devices or the comparing mechanism and adapted to be moved free of said detail record sorting means when said punch disabling means is operated.

13. In a machine for handling master and detail records, including a comparing mechanism for cyclically sensing comparisons or non-comparisons between designative data pre-punched in selected portions of such records, a punch mechanism for transferring additional data pre-punched in master records to detail records, and master and detail record feeding mechanisms, the combination of, front and rear master record receiving receptacles and front and rear detail record receiving receptacles, deflectors to shunt records into said receptacles, means for rendering both rear receptacle deflectors effective or ineffective to so shunt records, and selective means for influencing each of the front receptacle deflectors, the means associated with the front detail record deflector including a first latch to hold said deflector ineffective and a trip to disable said first latch and free the deflector therefrom, a record receiving receptacle common to both master and detail records, a retract mechanism operable to disable said punch mechanism momentarily during each machine cycle, a second latch, pre-settable to be effective to hold said retract mechanism operated when a comparison is sensed and to be rendered ineffective when a non-comparison is sensed; with a third latch, pre-settable to be effective to hold said second latch ineffective for the first comparison cycle following a non-comparison cycle and to be rendered ineffective to so influence said second latch by the detail record feeding mechanism during the second comparison cycle, and a rocking member associated with the retract mechanism and acting when said retract mechanism is not operated to disable the trip for said first latch, allowing said first latch to lock the front detail record deflector ineffective.

14. In a machine for handling master and detail records, including a comparing mechanism for cyclically sensing comparisons or non-comparisons between designative data pre-punched in selected portions of said records and a punch mechanism for transferring additional data pre-punched in master records to detail records, the combination of, master and detail record feeding mechanisms, a plurality of master record receiving receptacles and a plurality of detail record receiving receptacles, deflectors to shunt records into said receptacles, means to render said deflectors effective or ineffective to so shunt records, the means associated with one of the detail record deflectors including a pre-settable first latch to hold said deflector ineffective and a trip to free said deflector from said first latch and hold it so freed, a record receiving receptacle common to both master and detail records, a retract mechanism including a retract shaft, and operable to disable said punch mechanism momentarily during each machine cycle, a second latch, pre-settable to hold said retract mechanism operated when a comparison is sensed and to be rendered ineffective by the comparing mechanism when a non-comparison is sensed; with a third latch pre-settable to hold said second latch ineffective for the first comparison cycle following a non-comparison cycle and to be rendered ineffective to influence said second latch by the detail record feeding mechanism during the second comparison cycle, and a rocking member connected with the retract shaft and settable to disable the trip for said first latch when said retract mechanism is not held operated.

15. In a machine for handling master and detail records, including a comparing mechanism for cyclically sensing comparisons or non-comparisons between designative data pre-punched in selected portions of said records and a punch mechanism for transferring additional data pre-punched in master records to detail records, the combination of master and detail record feeding mechanisms, a plurality of master record receiving receptacles and a plurality of detail record receiving receptacles, deflectors to shunt records into said receptacles, means to render said deflectors effective of ineffective to so shunt records, the means associated with one of the detail record deflectors including a pre-settable first latch to hold said deflector ineffective and a trip to free said deflector from said first latch and hold it so freed, a record receiving receptacle common to both master and detail records, a retract mechanism including a retract shaft, and operable to disable said punch mechanism momentarily during each machine cycle, a second latch, pre-settable to hold said retract mechanism operated when a comparison is sensed and to be rendered ineffective by the comparing mechanism when a non-comparison is sensed; with a third latch pre-settable to hold said second latch ineffective for the first comparison cycle following a non-comparison cycle and to be rendered ineffective to influence said second latch by the detail record feeding mechanism during the second comparison cycle, and a member connected with the retract shaft and pre-settable to disable the trip for said first latch when said retract mechanism is not held operated, allowing said detail record deflector to be locked ineffective by said first latch.

OTTO E. KASE.

No references cited.